United States Patent Office 3,038,622
Patented June 12, 1962

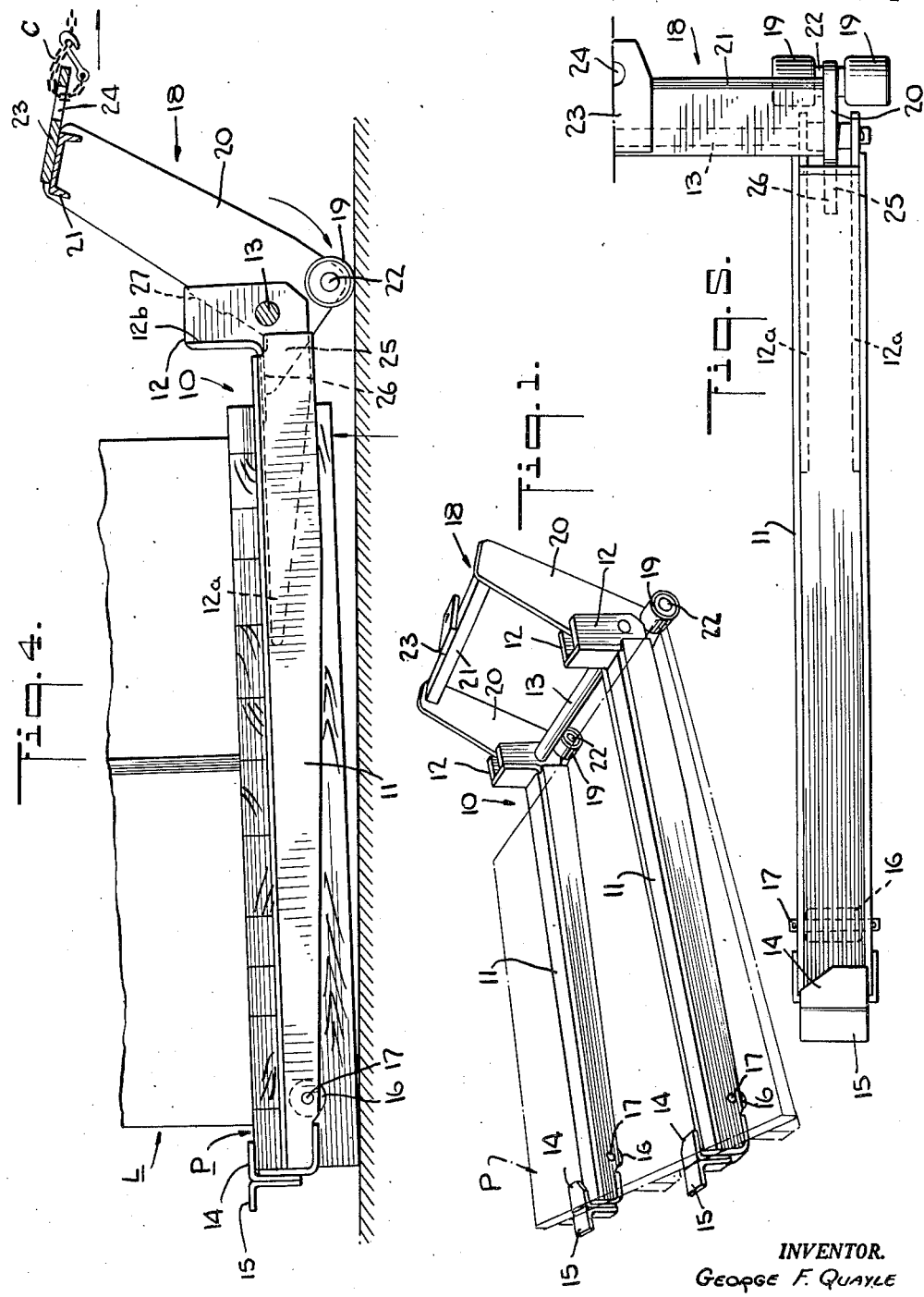

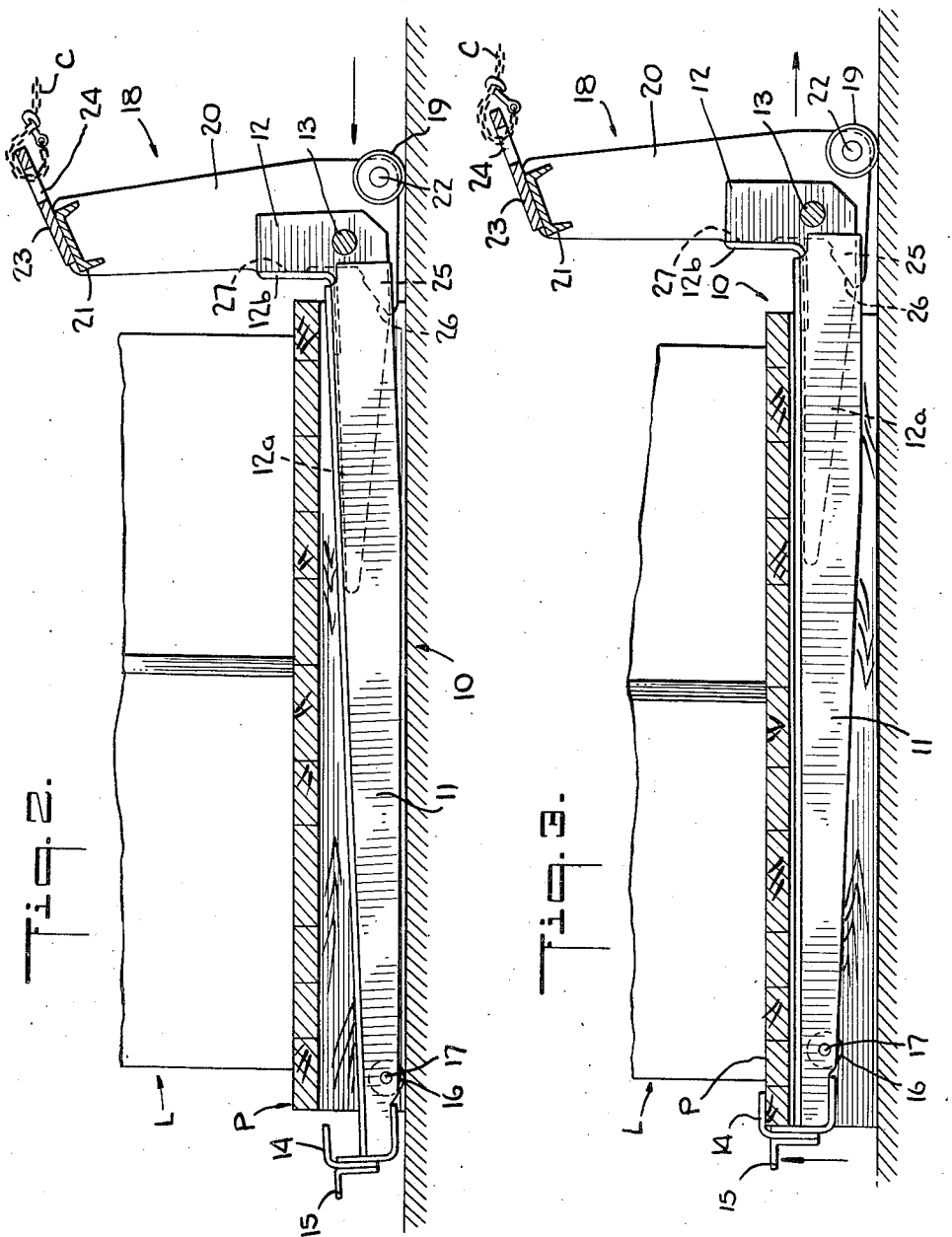

3,038,622
TINPLATE COIL HANDLER
George F. Quayle, Philadelphia, Pa., assignor to The Yale and Towne Manufacturing Company, Stamford, Conn., a corporation of Connecticut
Filed June 17, 1960, Ser. No. 36,983
5 Claims. (Cl. 214—350)

This invention relates to a rig for handling a heavy pallet-supported load.

In some instances a pallet-supported load may be so heavy that the floor on which it is supported will not support both the load and a conventional lift truck so that the removal of the pallet-supported load from the particular floor area poses a problem unless other expensive, specialized equipment is available for handling the load. This is particularly true in removing pallet-supported rolls of tin plate from the flat bed of a trailer truck as such rolls commonly weight between 16,000 and 20,000 pounds, and the combined weight of one of these rolls and a conventional lift truck of a size to lift such a roll would exceed the floor capacity of the bed of the trailer truck.

The present invention provides an extremely simple, inexpensive, light-weight rig by which a heavy pallet-supported load may be engaged and dragged from a floor area which might be overloaded if a conventional lift truck were used to pick up the load. The rig and the engaged load may be easily dragged by means of a conventional tractor or lift truck operating at a distance from the load and connected to the rig by means of a cable or chain. The use of the rig of the invention therefore eliminates the necessity of acquiring other expensive, specialized equipment for handling such loads.

In accordance with the invention, the rig includes a simple frame adapted to be inserted through a pallet and having means on one end engageable with an edge of the upper surface of the pallet so that a pulling force may be transmitted from the frame to the pallet when the end of the frame is lifted relatively to the pallet. The other end of the frame is provided with rollers carried by a lever member which is pivotally attached to the frame so that when a pulling force is applied to the upper end of the lever member the rollers will be forced downwardly relatively to the frame to thereby raise one end of the frame and pallet. In this manner, one end of the pallet-supported load is carried on the rollers with the other end supported on the floor, and the pallet-supported load may be easily dragged by continued application of a pulling force to the lever member.

As a feature of the invention, stop means are provided for preventing movement of the rollers to a past-center position relatively to the pivot of the lever member so that when the pulling force is released, the rollers will be pivoted upwardly relatively to the frame under the weight of the load, and the pallet will be lowered against the floor along the full length thereof to provide its own braking action to prevent runaway. Stop means are also provided for limiting upward movement of the rollers relatively to the frame so that when the pulling force is released and the frame is lowered relatively to the rollers, the rollers will still support the frame, but at a lower elevation, so that the frame can be readily moved into and out of a pallet. Such movement is further facilitated by fixed rollers provided on the opposite end of the frame which are raised from the floor when the end of the frame is lifted to engage the edge of the upper surface of the pallet.

The invention and its advantages having been broadly described, a more detailed description of one embodiment of the invention is given hereafter by reference to the accompanying drawings, wherein:

FIG. 1 is a perspective view showing a rig constructed in accordance with the invention, engaged with a pallet, FIG. 2 is a sectional view showing the frame of the rig inserted through a pallet preparatory to engagement of the rig with the pallet, FIG. 3 is a sectional view similar to that of FIG. 2, showing one end of the frame raised to engage the edge of the upper surface of the pallet, FIG. 4 is a sectional view similar to that of FIG. 3, showing the lever member of the rig pivoted relatively to the frame to raise one end of the pallet preparatory to dragging the pallet, and FIG. 5 is a partial plan view showing one half of the rig.

Referring to the drawings, and in particular to FIG. 1, the rig includes a simple frame 10 which is adapted to be inserted through a conventional pallet P.

The frame 10 is conveniently formed by a pair of parallel, laterally spaced, channel-shaped legs 11, each having an upstanding channel member 12 secured to one end thereof. The legs 11 are rigidly secured together to form an integral frame unit by means of a shaft 13 which extends through each of the upstanding channel members 12 and is welded or otherwise secured to the channel members 12.

The upstanding channel members 12 are conveniently secured to the ends of the legs 11 by integral extensions 12a which extend into the ends of the legs 11, as best shown in FIG. 5, and are welded or otherwise secured to the legs 11.

As best shown in FIG. 1, inturned angle clips 14 are secured to the opposite ends of the legs 11 and extend above the upper surfaces of the legs 11 so that they may be hooked over the edge of the upper surface of the pallet P when the legs 11 have been inserted through the pallet P and lifted off the floor. Out-turned angle clips 15 are secured to the clips 14 and are adapted to be engaged by a suitable pry-bar or jack to facilitate lifting of the ends of the legs 11 to engage the clips 14 over the edge of the pallet P. Rollers 16 are suitably journaled on shafts 17 which are secured to the legs 11 adjacent the outer ends thereof. The rollers 16 serve to support the ends of the legs 11 during insertion of the legs 11 through the pallet P, and during movement of the rig when the rig is not being used to move a pallet.

A lever member 18, carrying rollers 19 at its lower end, is pivotally attached to the opposite end of the frame 10 so that when a pulling force is applied to the upper end of the lever member 18, to pivot the upper end away from the frame 10, the end of the frame 10 will be lifted to raise one end of the pallet P off the floor and support the lifted end of the pallet P on the rollers 19.

The lever member 18 is conveniently formed by a pair of side plates 20 which are rigidly secured together at their upper ends by a channel member 21, and are suitably journaled at their lower ends on the portions of the shaft 13 which extend through the upstanding channel members 12. The rollers 19 are suitably journaled on shafts 22 which are secured to and extend from opposite sides of the lower ends of the side plates 20 outwardly of the shaft 13. A plate 23 is welded or otherwise secured to the channel member 21 and is provided with an eye 24 through which a cable or chain C may be connected so that a pulling force may be applied to the upper end of the lever member 18 to pivot the upper end of the lever member 18 away from the frame 10 to raise the end of the frame 10 and the pallet P.

The side plates 20 are provided with projecting portions 25 providing limiting surfaces 26 which are adapted to engage the under side of the upper surfaces of the legs 11 to prevent downward pivotal movement of the rollers 19 to a past-center position relatively to the shaft 13, i.e., beyond a position vertically below the shaft 13. Thus when the pulling force applied to the upper end of the lever 18 is relieved, the weight of the load and frame 10 will cause the rollers 19 to pivot outwardly and upwardly relatively to the frame 10 so that the pallet P is lowered against the floor along the full length thereof to provide its own braking effect to prevent runaway.

As best shown in FIG. 4, the inner edges of the plates 20 are provided with limiting surfaces 27 which engage the inner surfaces of the web portions 12b of the upstanding channel members 12 to prevent the rollers 19 from moving above the lower surfaces of the legs 11 when the frame 10 is lowered so that the frame 10 is supported on the rollers 19 in both the elevated and the lowered positions.

In utilizing the rig of the invention to move a load L supported on a pallet P, as shown in FIG. 2, the rig, while supported on the rollers 16 and the rollers 19, is inserted through the pallet P in the direction of the arrow as shown in FIG. 2. The end of the frame 10 carrying the clips 14 is then lifted and the rig moved in the direction of the arrow as shown in FIG. 3, to engage the clips 14 over the edge of the pallet P.

A pulling force is then applied to the upper end of the lever member 18 through the cable C by means of any available power source, such as a tractor or lift truck. This will cause the upper end of the lever member 18 to pivot away from the frame 10 so that the rollers 19 are pivoted downwardly to raise one end of the frame 10 and the pallet P off the floor, as shown in FIG. 4, until the limiting surfaces 26 of the projecting portions 25 engage the under sides of the upper surfaces of the legs 11. At this time one end of the pallet-supported load will be supported by the rollers 19 while the other end of the pallet P will be supported by the floor. The pallet-supported load can then be easily dragged by the continued application of sufficient pulling force to the upper end of the lever member 18.

If the pulling force is thereafter relieved for any reason, the weight of the frame 10 and the load will cause the rollers 19 to pivot outwardly and upwardly relatively to the frame to that the pallet P is lowered against the floor along the full length thereof to provide its own braking action to prevent runaway.

From the preceding description it can be seen that there is provided an extremely simple, inexpensive, light-weight rig by which a heavy pallet-supported load may be engaged and dragged from a floor area which might be overloaded if a conventional lift truck were used to pick up the load. The rig and the engaged load may be easily dragged by means of a conventional tractor or lift truck operating at a distance from the load and connected to the rig by means of a cable or chain. The use of the rig, therefore, eliminates the necessity of acquiring other expensive, specialized equipment for handling such loads.

While one embodiment of the invention has been shown and described, it will be appreciated that this is for the purpose of illustration and that changes and modifications may be made therein without departing from the spirit and scope of the invention.

I now claim:

1. A rig for handling a pallet supported load comprising, a frame adapted to be extended through said pallet below the upper surface of the pallet, fixed rollers carried by one end of said frame and extending below said frame to support said one end of said frame when said fixed rollers are in contact with the floor, means secured to said one end of said frame and extending above the upper surface of said frame so as to be engageable with an edge of the upper surface of said pallet when said frame is inserted through said pallet and said one end of said frame is raised relatively to said pallet to lift said fixed rollers from the floor, a generally vertically extending lever member pivotally attached to the other end of said frame, supporting rollers carried by said lever member adjacent the lower end thereof outwardly of the point of pivotal attachment of said lever member to said frame whereby pivotal movement of the upper end of said lever member away from said frame by a force applied thereto will cause downward pivotal movement of said supporting rollers relative to said frame to thereby lift said other end of said frame and the pallet from the floor, cooperating means on said frame and said lever member preventing downward pivotal movement of said supporting rollers to a position in which said supporting rollers are in a past-center relationship relatively to said point of pivotal attachment of said lever member whereby said supporting rollers will be pivoted outwardly and upwardly by the weight of the frame to thereby lower said frame when said force on said lever member is relieved, and cooperating means on said frame and said lever member preventing upward movement of said supporting rollers above the lower surface of said frame whereby said frame will be supported by said supporting rollers when said frame is lowered relatively to said supporting rollers.

2. A rig for handling a pallet-supported load comprising, a frame adapted to be extended through said pallet below the upper surface of the pallet, fixed rollers carried by one end of said frame and extending below said frame to support said one end of said frame when said fixed rollers are in contact with the floor, a hook member secured to said one end of said frame and extending above the upper surface of said frame for attaching said one end of said frame to an edge of the upper surface of said pallet when said frame is inserted through said pallet and said one end of said frame is raised relatively to said pallet to lift said fixed rollers from the floor, a generally vertically extending lever member pivotallly attached to the other end of said frame, supporting rollers carried by said lever member adjacent the lower end thereof outwardly of the point of the pivotal attachment of said lever member to said frame whereby pivotal movement of the upper end of said lever member away from said frame by a force applied thereto will cause downward pivotal movement of said supporting rollers relative to said frame to thereby lift said other end of said frame and the pallet from the floor, cooperating means on said frame and said lever member preventing downward pivotal movement of said supporting rollers to a position in which said supporting rollers are in a past-center relationship relatively to said point of pivotal attachment of said lever member whereby said supporting rollers will be pivoted outwardly and upwardly by the weight of the frame to thereby lower said frame when said force on said lever member is relieved, and cooperating means on said frame and said lever member preventing upward movement of said supporting rollers above the lower surface of said frame whereby said frame will be supported by said supporting rollers when said frame is lowered relatively to said supporting rollers.

3. A rig for handling a pallet-supported load comprising, a frame adapted to be extended through said pallet below the upper surface of the pallet, fixed rollers carried by one end of said frame and extending below said frame to support said one end of said frame when said fixed rollers are in contact with the floor, means secured to said one end of said frame and extending above the upper surface of said frame so as to be engageable with an edge of the upper surface of said pallet when said frame is inserted through said pallet and said one end of said frame is raised relatively to said pallet to lift said fixed rollers from the floor, a generally vertically extending lever member pivotally attached to the other end of said frame, supporting rollers operatively connected to said lever member for vertical movement by said lever member whereby pivotal movement of the upper end of said lever member away from said frame by a force applied thereto will cause downward movement of said supporting rollers relatively to said frame to lift said other end of said frame and the pallet from the floor, and means on said frame preventing upward movement of said supporting rollers above the lower surface of said frame whereby said frame will be supported by said supporting rollers when said frame is lowered relatively to said supporting rollers upon release of said force on said lever member.

4. A rig for handling a pallet-supported load comprising, a frame adapted to be extended through said pallet below the upper surface of the pallet, rollers carried by one end of said frame and extending below said frame to support one end of said frame when said rollers are in contact with the floor, means secured to said one end of said frame and extending above the upper surface of said frame so as to engage an edge of the upper surface of said pallet when said frame is inserted through said pallet and said one end of said frame is raised relatively to said pallet to lift said rollers from the floor, a lifting member movably mounted on the other end of said frame, supporting rollers operatively connected to said lifting member and movable vertically by movement of said lifting member to lift one end of said pallet from the floor whereby said one end of said pallet is carried on said supporting rollers and the other end of said pallet is supported on the floor.

5. A rig for handling a pallet of the type having an upper load supporting surface and surfaces lying against the floor comprising, a frame adapted to be extended through said pallet between the upper load supporting surface of said palllet and said surfaces lying against the floor, means for attaching the rear end of said frame to the rear edge of said upper load supporting surface of said pallet after said frame is inserted through said pallet and said rear end is raised off the floor whereby to leave the pallet supported on the floor, and a lifting member movably mounted on the forward end of said frame supporting rollers operatively connected to said lifting member and movable vertically by movement of said lifting member to raise said forward end of said frame a sufficient amount to lift the forward end of said pallet from the floor and to support said forward end of said pallet on said rollers whereby said forward end of said pallet is supported by said rollers and the rear end of said pallet remains in contact with the floor.

References Cited in the file of this patent

UNITED STATES PATENTS

| | | |
|---|---|---|
| 2,420,001 | McCollum | May 6, 1947 |
| 2,521,819 | Baer | Sept. 12, 1950 |

FOREIGN PATENTS

| | | |
|---|---|---|
| 826,129 | Great Britain | Dec. 31, 1959 |